United States Patent
Almahallawy et al.

(10) Patent No.: US 9,621,540 B2
(45) Date of Patent: Apr. 11, 2017

(54) SECURE PROVISIONING OF COMPUTING DEVICES FOR ENTERPRISE CONNECTIVITY

(71) Applicant: Intel Corporation, Santa Clara, CA (US)

(72) Inventors: Khaled I. Almahallawy, Hillsboro, OR (US); Yasser Rasheed, Beaverton, OR (US); Hormuzd M. Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 518 days.

(21) Appl. No.: 13/723,890

(22) Filed: Dec. 21, 2012

(65) Prior Publication Data

US 2014/0181504 A1 Jun. 26, 2014

(51) Int. Cl.
*H04L 29/06* (2006.01)

(52) U.S. Cl.
CPC ........ *H04L 63/0823* (2013.01); *H04L 63/062* (2013.01)

(58) Field of Classification Search
USPC ........................................ 726/5, 10
See application file for complete search history.

(56) References Cited

U.S. PATENT DOCUMENTS

| | | | |
|---|---|---|---|
| 6,980,660 B1* | 12/2005 | Hind | H04L 63/0823 380/277 |
| 2004/0054629 A1* | 3/2004 | de Jong et al. | 705/51 |
| 2009/0217362 A1* | 8/2009 | Nanda | G06F 21/33 726/5 |
| 2011/0055903 A1* | 3/2011 | Leggette | 726/4 |
| 2012/0260330 A1* | 10/2012 | Zlatarev et al. | 726/10 |

OTHER PUBLICATIONS

Intel Corporation, "Intel Identity Protection Technology (Intel IPT) with Public Key Infrastructure (PKI)," retrieved from <http://www.intel.com/content/www/us/en/architecture-and-technology/identity-protection/public-key-infrastructure.html?wapkw=ipt> on Nov. 14, 2012, 2 pages.

Intel Corporation et al, "Enhance Security with Simple Two-Factor Authentication," 2012, 4 pages.

Intel Corporation, "Intel Identity Protection Technology with PKI (Intel IPT with PKI)," Apr. 2012, 9 pages.

Intel Corporation, "Intel® vPro™ Technology Use Case Reference Design," May 2012, 57 pages.

Buchholz et al., "The Future of Enterprise Computing: Preparing for the Compute Continuum," IT@Intel White Paper, May 2011, 8 pages.

(Continued)

*Primary Examiner* — Christopher Brown

(74) *Attorney, Agent, or Firm* — Barnes & Thornburg LLP

(57) ABSTRACT

Technologies for securely provisioning a personal computing device for enterprise connectivity includes a trusted computing device for wirelessly communicating with the personal computing device, generating a key pair for the personal computing device, generating a certificate signing request, sending the certificate signing request on behalf of the personal computing device, receiving an access certificate for enterprise connectivity, and securely exporting the access certificate and a private key of the key pair to the personal computing device.

17 Claims, 6 Drawing Sheets

(56) References Cited

OTHER PUBLICATIONS

RSA Security Inc., "Public-Key Cryptography Standards (PKCS)—PKCS #10 v1.7: Certification Request Syntax Standard," May 26, 2000, 10 pages.

RSA Data Security, Inc., "Public-Key Cryptography Standards (PKCS)—PKCS 12 v1.0: Personal Information Exchange Syntax," Jun. 24, 1999, 23 pages.

Wikipedia, "Public-key infrastructure," retrieved from <http://en.wikipedia.org/w/index.php?title=Public-key_infrastructure&oldid=517151423>, last modified Oct. 11, 2012, 5 pages.

Wikipedia, "Certificate signing request," retrieved from <http://en.wikipedia.org/w/index.php?title=Certificate_signing_request&oldid=521098177>, last modified Nov. 2, 2012, 3 pages.

\* cited by examiner

SECURE PROVISIONING OF COMPUTING DEVICES FOR ENTERPRISE CONNECTIVITY

BACKGROUND

Mobile computing devices, such as laptops, smartphones, mobile internet devices (MIDs), and tablets are becoming ubiquitous tools for personal, business, and social uses. Modern mobile computing devices are often equipped with increased processing power and data storage capability to allow such devices to perform advanced processing. For example, many modern computing devices, such as typical "smart phones," are capable of executing specialized operating systems and associated software applications. Additionally, many modern mobile computing devices are capable of connecting to various data networks, including the Internet and corporate intranets, to retrieve and receive data communications over such networks. As such, an increasing trend among users is to purchase and carry a single "multi-purpose" mobile computing device, which is capable of sending and receiving data between resources located on the Internet and resources located on a secure corporate network. Many times, such mobile computing devices are purchased and maintained by the users themselves, which makes it difficult for businesses to securely provision those devices with the credentials needed to access corporate networks.

To securely provision a personal computing device for access to information on a corporate network, users are often required to first register with a third-party service provider. After registration, users typically download a software application or tool onto their personal computing device, which provides secure access to resources on the corporate network through an infrastructure maintained by the third-party service provider. Oftentimes, the corporate network resources provided through the third-party service are limited in nature.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
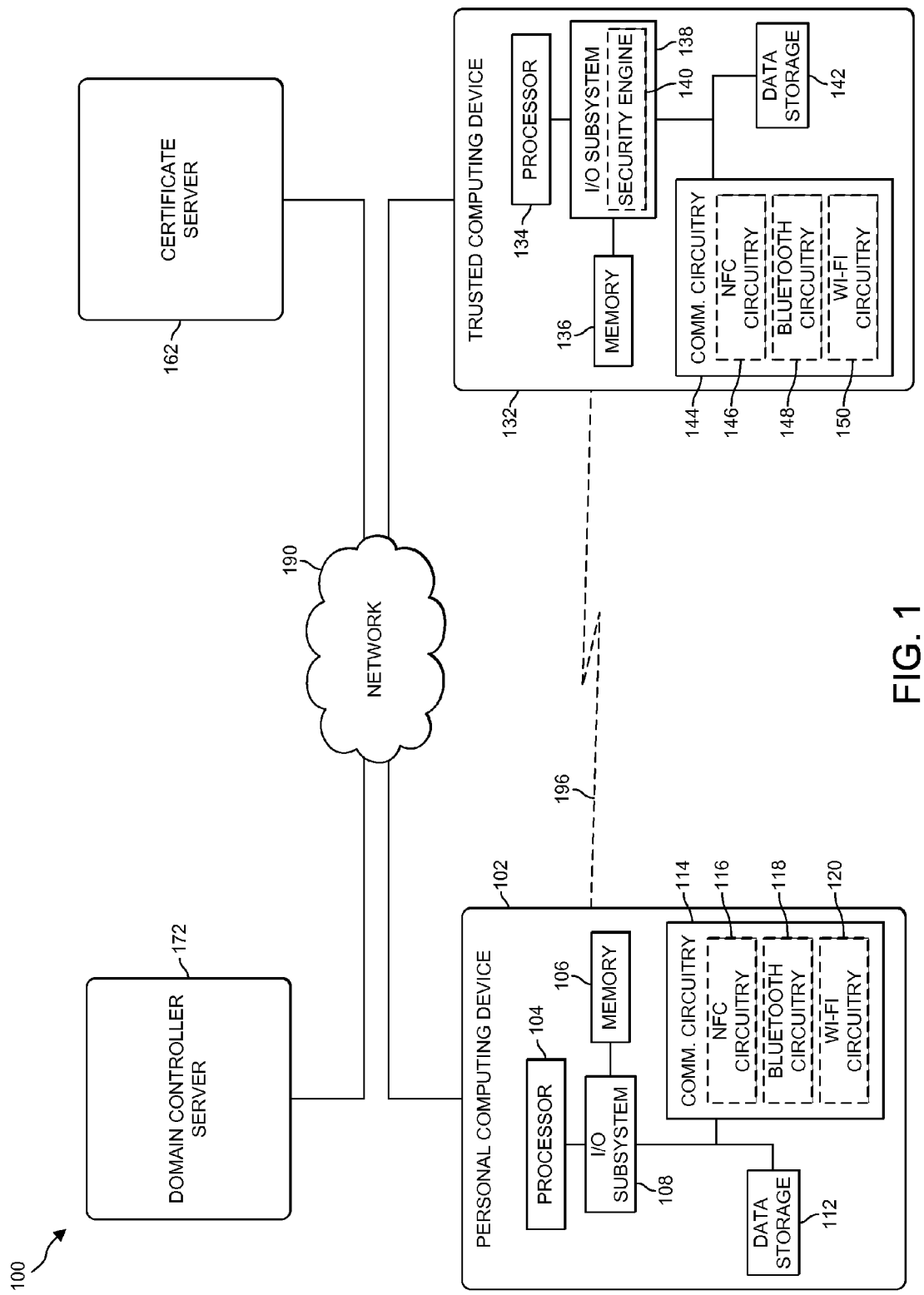
FIG. 1 is a simplified block diagram of at least one embodiment of a system for securely provisioning a personal computing device for enterprise connectivity.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for securely provisioning a computing device for enterprise connectivity includes a mobile or personal computing device 102, a certificate server 162, a domain controller server 172, a trusted computing device 132, and a network 190. It should be understood that although the personal computing device 102 is provisioned for enterprise network connectivity (e.g., via the network 190) in the illustrative embodiment, the personal computing device 102 may be securely provisioned for access to any type of secure network maintained by any type of entity (e.g., corporate intranets, small-business networks, home networks, etc.). As discussed in more detail below, the trusted computing device 132 may already be provisioned for enterprise connectivity in some embodiments. That is, the trusted computing device 132 may already possess the access certificate(s) needed to communicate with one or more of the certificate server 162, the domain controller server 172, and/or other computing devices over the network 190. As such, in some embodiments, the trusted computing device 132 may be used as an intermediary device to facilitate provisioning the personal computing device 102 with one or more access certificates needed to access other computing devices and/or services on the network 190.

In use, the personal computing device 102 and the trusted computing device 132 are capable of bi-directional wireless communication with each other. As discussed in more detail below, the personal computing device 102 may be configured to communicatively connect with the trusted computing device 132 using a wireless communication channel 196. After connecting, the trusted computing device 132 may generate a key pair and a certificate signing request on behalf of the personal computing device 102. The trusted computing device 132 may then send the certificate signing request to the certificate server 162, which may generate an access certificate in response to validating that the personal computing device 102 is registered with the domain controller server 172 and that the user of the personal computing device 102 has the requisite permissions for provisioning the new device. The access certificate may be obtained from the certificate server 162 and then securely exported to the personal computing device 102, which may use the certificate to access information and services (e.g., virtual private network services, Hypertext Transfer Protocol services, e-mail services, etc.) on an enterprise network 190. In that way, the trusted computing device 132 may be used as an intermediary device for securely provisioning the personal computing device 102 with the certificates needed to directly access the enterprise network 190. That is, the personal computing device 102 may be provisioned with the requisite access certificates without requiring the services and/or software of a third-party provisioning service.

The trusted computing device 132 may be embodied as any type of computing device or server capable of performing the functions described herein. As discussed, the trusted computing device 132 may already be provisioned for enterprise connectivity. As such, the trusted computing device 132 may be configured to operate as an intermediary device to facilitate provisioning access certificates to the personal computing device 102. Although only one trusted computing device 132 is shown in FIG. 1, it should be appreciated that the system 100 may include any number of (e.g., multiple) trusted computing devices 132 in other embodiments. As shown in FIG. 1, the illustrative trusted computing device 132 includes a processor 134, a memory 136, an input/output (I/O) subsystem 138, a data storage 142, and communication circuitry 144. Of course, the trusted computing device 132 may include other or additional components, such as those commonly found in a computer and/or server (e.g., various input/output devices), in other embodiments. Additionally, in some embodiments, one or more of the illustrative components may be incorporated in, or otherwise from a portion of, another component. For example, the memory 136, or portions thereof, may be incorporated in the processor 134 in some embodiments.

The processor 134 may be embodied as any type of processor capable of performing the functions described herein. For example, the processor 134 may be embodied as a single or multi-core processor(s), digital signal processor, microcontroller, or other processor or processing/controlling circuit. Similarly, the memory 136 may be embodied as any type of volatile or non-volatile memory or data storage capable of performing the functions described herein. In operation, the memory 136 may store various data and software used during operation of the trusted computing device 132 such as operating systems, applications, programs, libraries, and drivers. The memory 136 is communicatively coupled to the processor 134 via the I/O subsystem 138, which may be embodied as circuitry and/or components to facilitate input/output operations with the processor 134, the memory 136, and other components of the trusted computing device 132. For example, the I/O subsystem 138 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 138 may form a portion of a system-on-a-chip (SoC) and be incorporated, along with the processor 134, the memory 136, and other components of the trusted computing device 132, on a single integrated circuit chip.

In some embodiments, the I/O subsystem 138 may include a security engine 140, which may be embodied as an embedded microprocessor, such as a security co-processor, that operates independently of the processor 134 to provide a secure and isolated environment that cannot be accessed by the processor 134 or other components of the trusted computing device 132. In such embodiments, the security engine 140 may manage the storage of one or more encryption keys used by the trusted computing device 132 to secure data and/or communications between the trusted computing device 132 and one or more of the personal computing device 102, the certificate server 162, and the domain controller server 172. In such embodiments, the one or more encryption keys may be stored in a portion of memory 136 that is accessible to the security engine 140 and inaccessible to other components of the trusted computing device 132. In other embodiments, the security engine 140 may include internal or local secured memory, separate from the memory 136, in which the encryption keys may be stored. It should be appreciated that the security engine 140 may also securely store other types of data in the portion of memory 136 that is accessible to the security engine 140 and inaccessible to other components of the trusted computing device 132. Additionally, the security engine 140 may, in some embodiments, function in an operational power state while the processor 134 and other components of the trusted computing device 132 are in a low-power state (e.g., sleep, hibernate, etc.) or are powered-down. As discussed in more detail below, in some embodiments, the security engine 140 may also generate a public/private key pair on behalf of the personal computing device 102 to facilitate provisioning the personal computing device 102 for enterprise connectivity. It should be appreciated that in some embodiments, however, other components of the trusted computing device 132 may instead generate the public/private key pair on behalf of the personal computing device 102.

Additionally, it should be appreciated that in embodiments wherein the trusted computing device 132 includes a security engine 140, the security engine 140, or any of the functionality thereof, may be implemented using Intel® Active Management Technology (AMT), using a portion of Intel® AMT, using an Intel® Management Engine (ME), using Intel® vPro™ Technology, using Intel® Core™ vPro™ Technology, using Intel® Identity Protection Technology (IPT), and/or using Intel® IPT with Public Key Infrastructure (PKI), each of which are available from Intel Corporation of Santa Clara, Calif., and/or within chipsets available from Intel Corporation. It should be appreciated, however, that the security engine 140, or any of the functionality thereof, may be implemented using other components and/or technologies of trusted computing devices available from other manufacturers.

The communication circuitry 144 of the trusted computing device 132 may be embodied as any communication circuit, device, or collection thereof, capable of enabling communications between the trusted computing device 132 and one or more of the personal computing device 102, the certificate server 162, the domain controller server 172, and/or other computing devices. The communication circuitry 144 may be configured to use any one or more communication technology (e.g., wireless or wired communications) and associated protocols (e.g., Ethernet, Wi-Fi®, WiMAX, etc.) to effect such communication.

In some embodiments, the trusted computing device 132 communicates with one or more of the personal computing device 102, the certificate server 162, and/or the domain controller server 172 over a network 190. The network 190 may be embodied as any number of various wired and/or wireless communication networks. For example, the network 190 may be embodied as or otherwise include a local area network (LAN), a wide area network (WAN), a cellular network, or a publicly-accessible, global network such as the Internet. As such, it should be appreciated that the network 190 may also include any number of additional devices to facilitate communication between the trusted computing device 132 and one or more of the personal computing device 102, the certificate server 162, the domain controller server 172, and/or the other computing devices. In some embodiments, the network 190 may be embodied as a secure enterprise network across which only authorized computing devices are permitted to access information and services. In such embodiments, the network 190 and/or communications within the network 190 may be secured using asymmetric cryptography (e.g., public/private key pairs), which may be managed according to a public-key infrastructure (PKI).

As discussed in more detail below, the trusted computing device 132 may directly communicate with the personal computing device 102 over a communication channel 196 such as, for example, a wireless communication channel. To facilitate such communications, the communication circuitry 144 may include one or more types of short-range wireless communication circuitry. For example, in some embodiments, the communication circuitry 144 may include one or more of Near Field Communication (NFC) circuitry 146 and Bluetooth® circuitry 148. Additionally or alternatively, the communication circuitry 144 may include Wi-Fi® circuitry 150 in some embodiments. It should be understood that although the communication circuitry 144 includes one or more of NFC circuitry 146, Bluetooth® circuitry 148, and Wi-Fi® circuitry 150 in the illustrative embodiment, the communication circuitry 144 may include any other type of communication circuitry (e.g., wired or wireless) suitable for establishing a direct connection between the trusted computing device 132 and the personal computing device 102. For example, in some embodiments, a direct connection may be established between the trusted computing device 132 and the personal computing device 102 via a Universal Serial Bus (USB) connection, a fiber optic connection, and infrared connection, and/or an Ethernet connection.

The data storage 142 may be embodied as any type of device or devices configured for short-term or long-term storage of data such as, for example, memory devices and circuits, memory cards, hard disk drives, solid-state drives, or other data storage devices.

The personal computing device 102 may be embodied as any type of computing device capable of performing the functions described herein including, but not limited to, a mobile phone, a smart phone, a tablet computing device, a personal digital assistant, a messaging device, a consumer electronic device, a handset, a laptop computer, a desktop computer, a server, and/or any other type of computing device. The illustrative personal computing device 102 includes a processor 104, a memory 106, an I/O subsystem 108, a data storage 112, and communication circuitry 114. Those components of the personal computing device 102 may be similar to the corresponding components of the trusted computing device 132, the description of which is applicable to the corresponding components of the personal computing device 102 and is not repeated herein for clarity of the description. Additionally, as discussed in more detail below, the personal computing device 102 may directly communicate with the trusted computing device 132 over the wireless communication channel 196 in some embodiments. To facilitate such communications, the communication circuitry 114 may include one or more types of wireless communication circuitry. For example, in some embodiments, the communication circuitry 114 may include one or more of Near Field Communication (NFC) circuitry 116, Bluetooth® circuitry 118, and Wi-Fi®, circuitry 120. It should be understood that although the communication circuitry 114 includes one or more of NFC circuitry 116, Bluetooth® circuitry 118, and Wi-Fi®, circuitry 120 in the illustrative embodiment, the communication circuitry 144 may include any other type of wired and/or wireless communication circuitry. For example, a direct connection may be established between the personal computing device 102 and the trusted computing device 132 via a Universal Serial Bus (USB) connection, a fiber optic connection, and infrared connection, and/or an Ethernet connection as discussed.

The certificate server 162 may be embodied as any type of server capable of performing the functions described herein. As such, the certificate server 162 may include various hardware and software components (e.g., a processor, memory, and communication circuitry) typically found in a server for communicating, storing, maintaining, and transferring data over the network 190. In operation, the certificate server 162 may be configured to generate one or more access certificates to facilitate provisioning computing devices for enterprise connectivity. In some embodiments, the certificate server 162 may be configured to communicate with the trusted computing device 132 over the network 190, which is acting on behalf of the personal computing device 102. In such embodiments, it should be appreciated that the trusted computing device 132 may have previously been provisioned with an access certificate generated by the certificate server 162. In that way, a trust between the certificate server 162 and the trusted computing device 132 may be previously established. As discussed in more detail below, the certificate server 162 may also be configured to receive a certificate signing request generated by the trusted computing device 132 on behalf of the personal computing device 102, generate an access certificate to provide enterprise connectivity to the personal computing device 102, and send the access certificate to the trusted computing device 132 for secure export to the personal computing device 102. In some embodiments, the certificate server 162 may also be configured to validate that the personal computing device 102 is registered with the domain controller server 172 and that the user of the personal computing device 102 has the requisite permissions for provisioning the new device for enterprise connectivity.

The domain controller server 172 may be embodied as any type of server capable of performing the functions described herein. As such, the domain controller server 172 may include various hardware and software components (e.g., a processor, memory, and communication circuitry) typically found in a server for communicating, storing, maintaining, and transferring data over the network 190. In some embodiments, the domain controller server 172 is configured to provide directory services (e.g., authentication and authorization services) to the network 190. For example, as discussed in more detail below, the domain controller server 172 may authenticate one or more users and/or computing devices of the network 190. The domain controller server 172 may also authorize the one or more users and/or computing devices to access resources on the network 190 based at least in part on, or otherwise as a function of, one or more corresponding security policies. As discussed in more detail below, the domain controller server 172 may determine whether the personal computing device 102 is registered with the domain controller server 172 and whether the user of the personal computing device 102 is authorized (e.g., has the appropriate permissions, etc.) to provision the device for enterprise connectivity.

Figure 2:
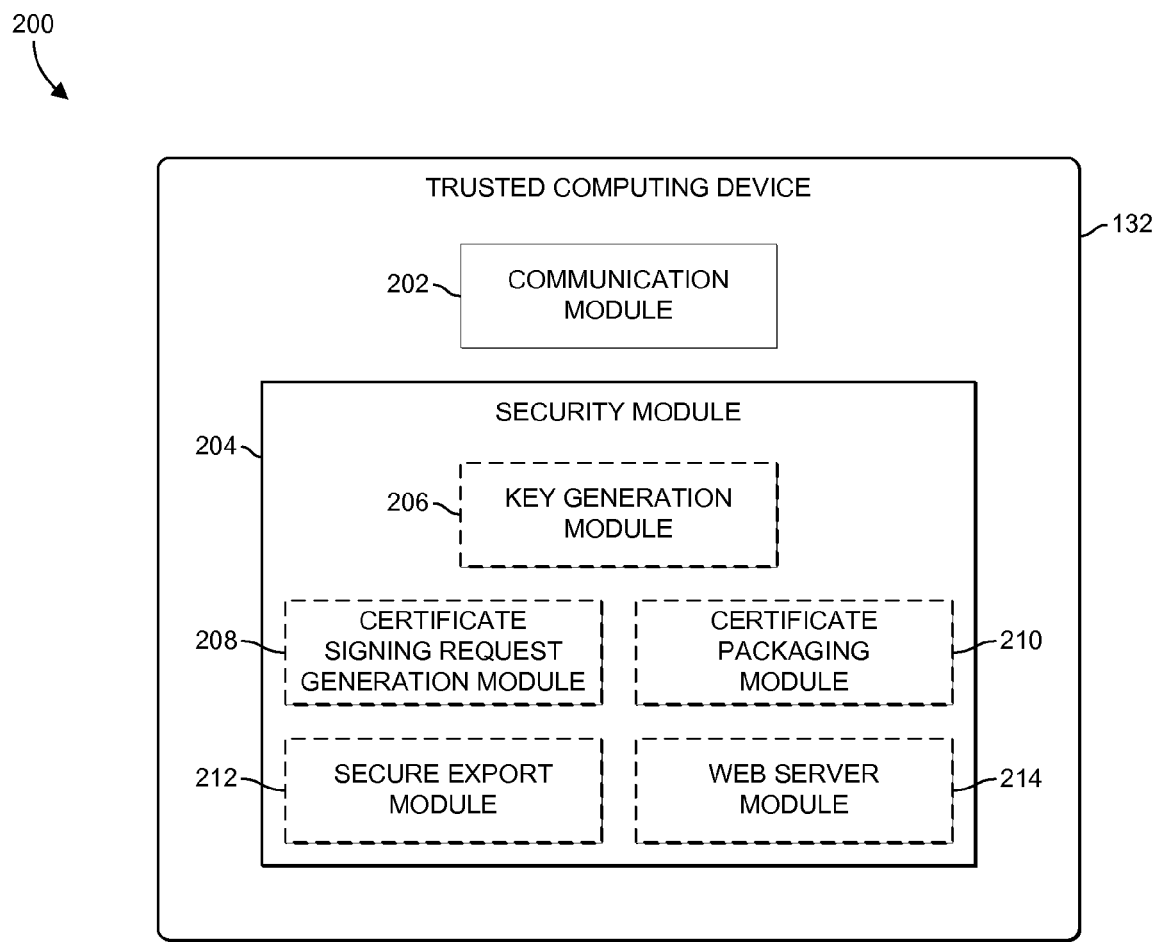
FIG. 2 is a simplified block diagram of at least one embodiment of an environment of the trusted computing device of the system of FIG. 1.

Referring now to FIG. 2, in one embodiment, the trusted computing device 132 establishes an environment 200 during operation. The illustrative environment 200 includes a communication module 202 and a security module 204, each of which may be embodied as software, firmware, hardware, or a combination thereof. It should be appreciated that the trusted computing device 132 may include other components, sub-components, modules, and devices commonly found in a computing device, which are not illustrated in FIG. 2 for clarity of the description.

The communication module 202 facilitates communications between the trusted computing device 132 and one or more of the personal computing device 102, the certificate server 162, the domain controller server 172, and/or other computing devices. In some embodiments, the communication module 202 is configured to directly send communications to and directly receive communications from the personal computing device 102. As discussed, the trusted computing device 132 and the personal computing device 102 may initially communicate directly using a wireless communication channel 196 such as, for example, an NFC communication channel, a Bluetooth® communication channel, and/or a Wi-Fi® communication channel. In such embodiments, the communication module 202 may be configured to wirelessly connect and/or pair directly with the personal computing device 102. That is, the communication module 202 may facilitate initial communications directly between the trusted computing device 132 and the personal computing device 102 via the communication channel 196 rather than over the network 190. Such direct communications via the communication channel 196 are advantageous in embodiments wherein the personal computing device 102 has not yet been provisioned for enterprise connectivity and, as a result, is not yet permitted to connect to and/or communicate with other computing devices via the network 190. Additionally or alternatively, the communication module 202 may also facilitate communications over the network 190 between the trusted computing device 132 and one or more of the certificate server 162, the domain controller server 172, and/or other computing devices. Furthermore, in some embodiments, the communication module 202 may facilitate communications over the network 190 with the personal computing device 102 after the personal computing device 102 has received the necessary certificate(s) to access the network 190.

As discussed in more detail below, the security module 204 of the trusted computing device 132 in some embodiments may include one or more components or sub-components to facilitate provisioning the personal computing device 102 for enterprise connectivity. For example, the security module 204 may include one or more of a key generation module 206, a certificate signing module 208, a certificate packaging module 210, a secure export module 212, and/or a web server module 214. In such embodiments, the communication module 202 may also be configured to facilitate communications between any component and/or sub-component of the security module 204 and one or more of the personal computing device 102, the certificate server 162, and/or the domain controller server 172.

The security module 204 may be configured in some embodiments to facilitate provisioning the personal computing device 102 with one or more access certificates, which as discussed in more detail below, may be received and/or downloaded from the certificate server 162 for the personal computing device 102. To do so, the security module 204 may generate a public/private key pair on behalf of the personal computing device 102. In some embodiments, the security module 204 may include a key generation module 206 to facilitate generating the public/private key pair. The key generation module 206 may use any suitable encryption algorithm for generating the public/private key pair. Additionally, in some embodiments, the public/private key pair may be generated by the security engine 140 of the trusted computing device 132. Further, the key generation module 206 may store the generated public/private key pair in the portion of memory 136 that is accessible to the security engine 140, but is inaccessible to other components of the trusted computing device 132 in some embodiments.

The security module 204 may also be configured to generate a certificate signing request on behalf of the personal computing device 102. The certificate signing request may be embodied as message to the certificate server 162 requesting that one or more access certificates be generated for the personal computing device 102. In some embodiments, the certificate signing request may include the public key generated by the key generation module 206. It should be appreciated that although the certificate signing request includes the public key generated by the key generation module 206 for the personal computing device 102 in the illustrative embodiment, the certificate signing request may also include other types of information associated with the personal computing device 102. For example, in some embodiments, the certificate signing request may also include information identifying one or more of the personal computing device 102 or a user of the personal computing device 102.

To facilitate generating the certificate signing request, the security module 204 may include a certificate signing request generation module 208 in some embodiments. In such embodiments, any suitable format (e.g., a certificate template appropriate for the PKI) may be used by the certificate signing request generation module 208 to generate the certificate signing request. For example, in some embodiments, the certificate signing request generation module 208 may generate the certificate signing request in accordance with various public-key cryptography standards such as, for example, those described in "PKCS #10 v1.7: Certification Request Syntax Standard" by RSA Security Inc., Public-Key Cryptography Standards (PKCS), published May 26, 2000.

In some embodiments, the security module 204 may package an access certificate received from the certificate server 162 and the private key into a secure container. In such embodiments, the security module 204 may include a certificate packaging module 210, which may use any appropriate mechanism for securely packaging the access certificate and the private key together. For example, in some embodiments, the certificate packaging module 210 may package the access certificate and the private key into a container protected by a passphrase or a password in accordance with various public-key cryptography standards such as, for example, those described in "PKCS 12 v1.0: Personal Information Exchange Syntax" by RSA Data Security, Inc., Public-Key Cryptography Standards (PKCS), published Jun. 24, 1999.

As discussed, the access certificate may be obtained (e.g., received and/or downloaded) from the certificate server 162 and then provided to the personal computing device 102 to enable access to information and/or services on the network 190. In some embodiments, the security module 204 may be configured to securely export the access certificate to the personal computing device 102. In such embodiments, the security module 204 may include a secure export module 212, which may encrypt the access certificate and private key using one or more encryption keys such as the ones generated and stored by the security engine 140 as discussed above.

Additionally or alternatively, in some embodiments, the security module 204 may include a web server module 214 to facilitate providing the access certificate and the private key to the personal computing device 102. In such embodiments, the web server module 214 may be configured to enable the personal computing device 102 to retrieve (e.g., download, access, obtain, etc.) the access certificate and the private key, or the secure container including the access certificate and the private key, directly from the trusted computing device 132. To facilitate communications with the web server module 214 and the retrieval of information (e.g., access certificates, public/private keys, etc.) by the personal computing device 102, the web server module 214 may be associated with a uniform resource locator (URL) or a network address (e.g., an Internet Protocol address) accessible over the network 190.

Figure 3:
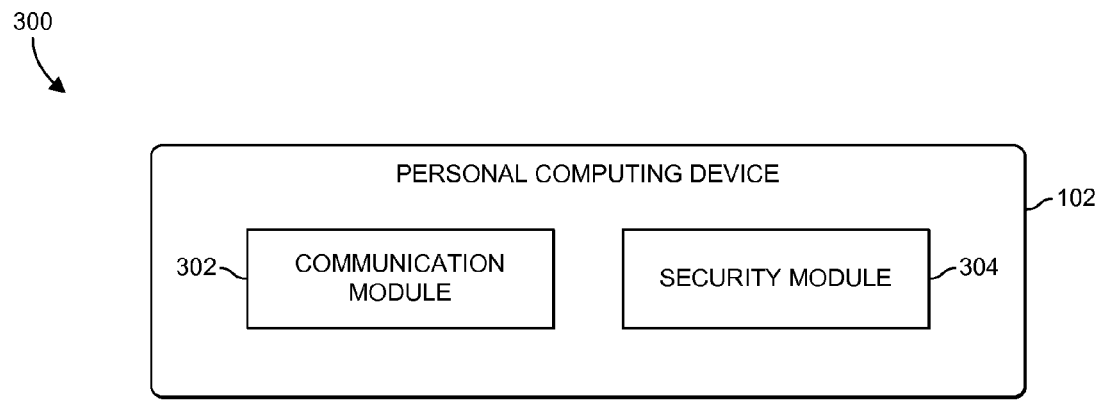
FIG. 3 is a simplified block diagram of at least one embodiment of an environment of the personal computing device of the system of FIG. 1.

Referring now to FIG. 3, in one embodiment, the personal computing device 102 establishes an environment 300 during operation. The illustrative environment 300 includes a communication module 302 and a security module 304, each of which may be embodied as software, firmware, hardware, or a combination thereof. It should be appreciated that the personal computing device 102 may include other components, sub-components, modules, and devices commonly found in a computing device, which are not illustrated in FIG. 3 for clarity of the description.

The communication module 302 facilitates communications between the personal computing device 102 and one or more of the trusted computing device 132, the certificate server 162, the domain controller server 172, and/or other computing devices. In some embodiments, the communication module 302 is configured to directly send and receive communications to and from the trusted computing device 132. As discussed, the personal computing device 102 and the trusted computing device 132 may initially communicate directly with each other using a wireless communication channel 196 such as, for example, an NFC communication channel, a Bluetooth® communication channel, and/or a Wi-Fi® communication channel. In such embodiments, the communication module 302 may be configured to wirelessly connect and/or pair directly with the trusted computing device 132. That is, the communication module 302 may facilitate initial communications directly between the personal computing device 102 and the trusted computing device 132 via the communication channel 196 rather than over the network 190. Such direct communications via the communication channel 196 are advantageous in embodiments wherein the personal computing device 102 has not yet been provisioned for enterprise connectivity and, as a result, is not yet permitted to connect to and/or communicate with other computing devices over the network 190. Additionally or alternatively, the communication module 302 may also facilitate communications over the network 190 between the personal computing device 102 and one or more of the trusted computing device 132, the certificate server 162, the domain controller server 172, and other computing devices after the personal computing device 102 has received the necessary certificate(s) to access the network 190.

The security module 304 may be configured to facilitate provisioning the personal computing device 102 with one or more access certificates, which as discussed, may be obtained by the trusted computing device 132 on behalf of the personal computing device 102. To do so, the security module 304 may facilitate the secure receipt of the access certificate and the private key from the trusted computing device 132. For example, in embodiments wherein the trusted computing device 132 utilizes an encryption key to encrypt the access certificate and the private key prior to export, the security module 304 of the personal computing device 102 may utilize a corresponding decryption key to decrypt the access certificate and the private key. Additionally or alternatively, the security module 304 may use a URL or an Internet Protocol address to retrieve the access certificate and the private key from the web server module 214 of the trusted computing device 132.

Figure 4:
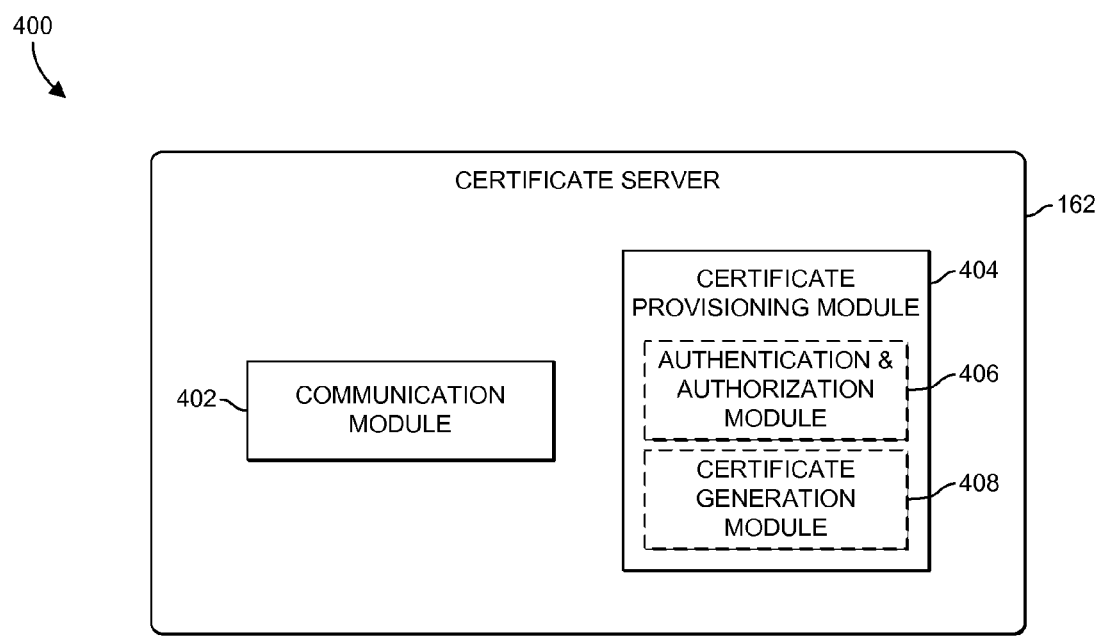
FIG. 4 is a simplified block diagram of at least one embodiment of an environment of the certificate server of the system of FIG. 1.

Referring now to FIG. 4, in one embodiment, the certificate server 162 establishes an environment 400 during operation. The illustrative environment 400 includes a communication module 402 and a certificate provisioning module 404, each of which may be embodied as software, firmware, hardware, or a combination thereof. It should be appreciated that the certificate server 162 may include other components, sub-components, modules, and devices commonly found in a server, which are not illustrated in FIG. 4 for clarity of the description.

The communication module 402 facilitates communications over the network 190 between the certificate server 162 and one or more of the trusted computing device 132, the domain controller server 172, and/or other computing devices. For example, in some embodiments, the communication module 402 may receive a certificate signing request generated by the trusted computing device 132 and sent over the network 190. The communication module 402 may also facilitate sending one or more verification requests to the domain controller server 172 over the network 190, which as discussed in more detail below, may be sent by the certificate provisioning module 404 or components thereof. Additionally, the communication module 402 may facilitate sending one or more access certificates, which as discussed in more detail below, may be generated by the certificate provisioning module 404 or components thereof. It should also be understood that once the personal computing device 102 is provisioned with a valid access certificate and is permitted to access devices and services on the network 190, the communication module 402 may also facilitate communications over the network 190 between the certificate server 162 and the personal computing device 102.

The certificate provisioning module 404 facilitates generating the one or more access certificates needed by the personal computing device 102 to access information and/or services on the network 190. In some embodiments, the certificate provisioning module 404 includes an authentication and authorization module 406. The authentication and authorization module 406 may be configured to validate and/or verify that the personal computing device 102 is registered with the domain controller server 172 and that the user of the personal computing device 102 is authorized to provision the device for enterprise connectivity. To do so, the authentication and authorization module 406 may send one or more requests over the network 190 to the domain controller server 172 requesting verification that the personal computing device 102 is registered and/or that the user of the personal computing device 102 is authorized to provision the device for enterprise connectivity. In some embodiments, the one or more verification requests sent to the domain controller server 172 may include identity information from the certificate signing request sent by the trusted computing device 132 on behalf of the personal computing device 102.

Additionally, the certificate provisioning module 404 includes a certificate generation module 408 in some embodiments. The certificate generation module 408 may generate an access certificate for the personal computing device 102 in response to determining that the personal computing device 102 is registered with the domain controller server 172 and that the user of the personal computing device 102 is authorized to provision the device for enterprise connectivity. To generate the access certificate, the certificate generation module 408 may, in some embodiments, digitally sign the public key that was generated by the trusted computing device 132 on behalf of the personal computing device 102. In such embodiments, the certificate generation module 408 may use a private key associated with the certificate server 162 to digitally sign the public key of the personal computing device 102.

After generating the access certificate, the certificate provisioning module 404 may send the access certificate to the trusted computing device 132 over the network 190. As discussed above, the trusted computing device 132 may then securely export or otherwise provide the access certificate to the personal computing device 102, which may then access other computing devices and/or services on the network 190 using the access certificate.

Figure 5:
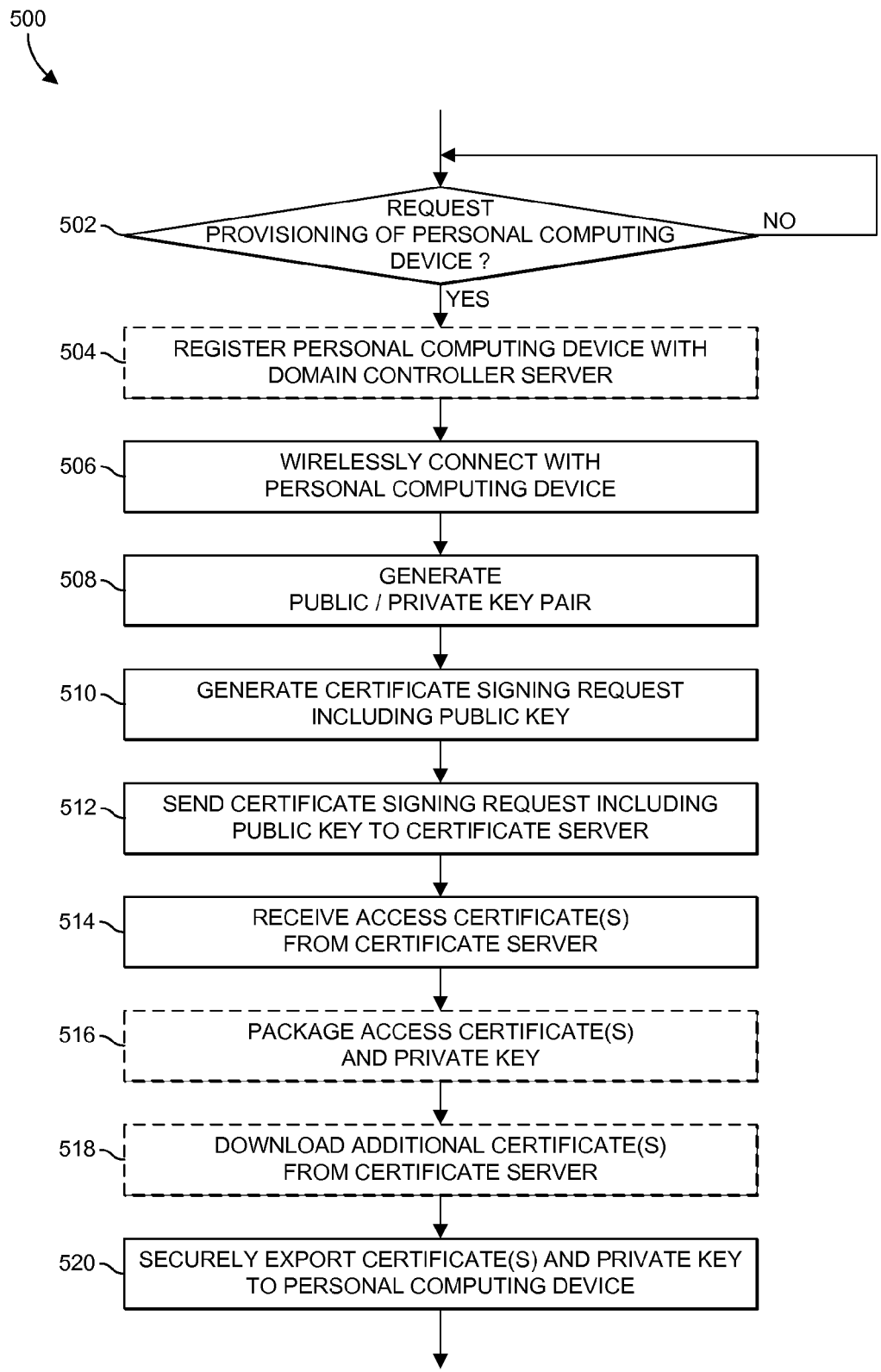
FIG. 5 is a simplified flow diagram of at least one embodiment of a method for securely provisioning a personal computing device for enterprise connectivity that may be executed by the trusted computing device of FIGS. 1 and 2.
Figure 7:
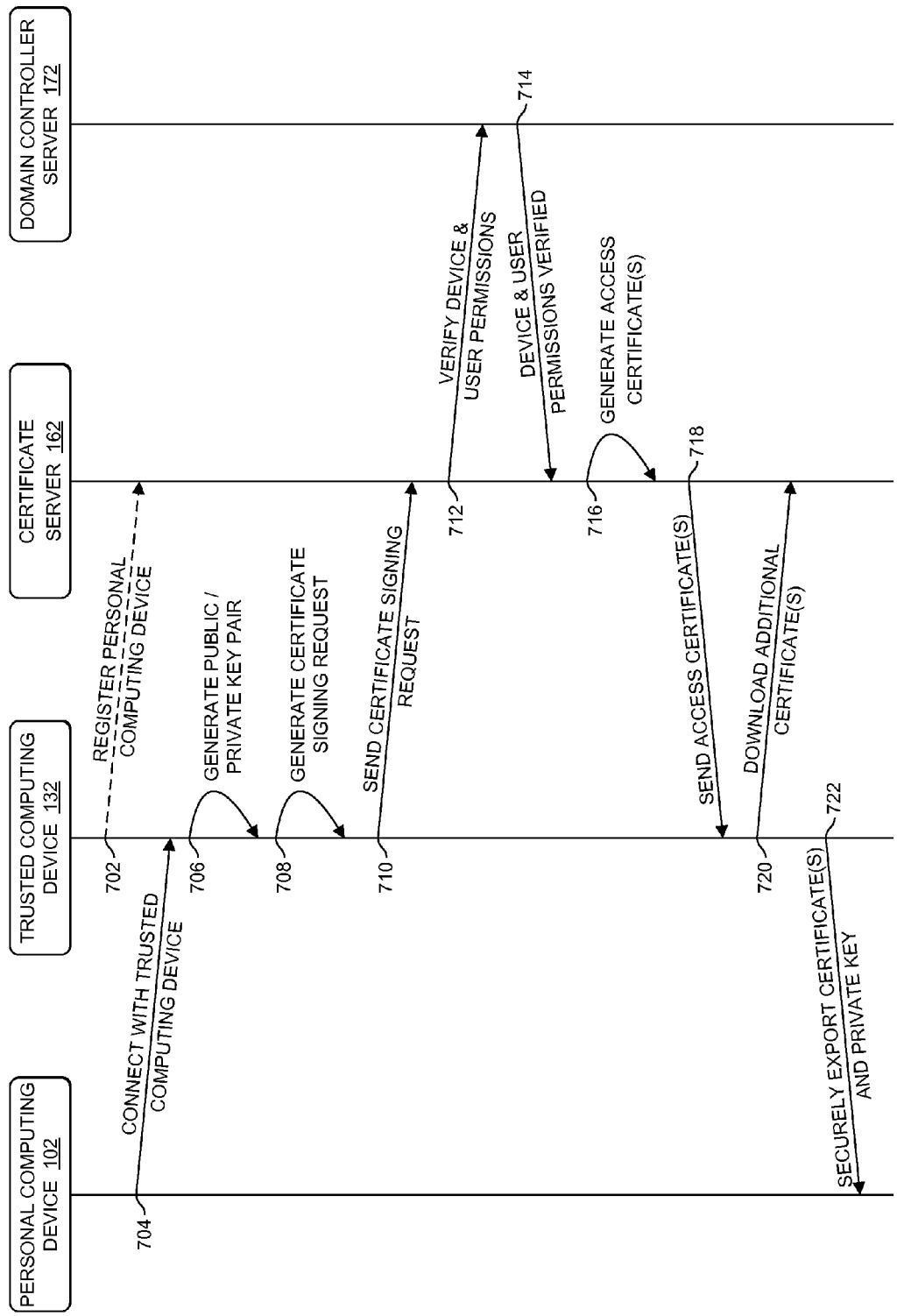
FIG. 7 is a simplified activity flow diagram of at least one embodiment of the methods of FIGS. 5 and 6 for securely providing a personal computing device with access certificates for enterprise connectivity.

Referring now to FIG. 5, taken with FIG. 7, in use, the trusted computing device 132 may execute a method 500 for securely provisioning the personal computing device 102 for enterprise connectivity. The method 500 begins with block 502 in which the trusted computing device 132 determines whether provisioning of the personal computing device 102 for enterprise connectivity has been requested. To do so, the trusted computing device 132 may determine, in some embodiments, whether the user has requested that the personal computing device 102 be provisioned with one or more access certificates needed to access the network 190 or one or more services on the network 190. In such embodiments, the trusted computing device 132 may detect whether the user has requested provisioning of the personal computing device 102 via one or more selections received from a user interface (UI) displayed on, for example, a display of the trusted computing device 132 or the personal computing device 102. It should be appreciated that although the trusted computing device 132 detects user input via a UI in the illustrative embodiment, the trusted computing device 132 may, in other embodiments, determine that provisioning of the personal computing device 102 has been requested in response to any suitable input (e.g., keypads, touch screens, voice recognition components, etc.) and/or notification (e.g., messages, signals, etc.) received from the trusted computing device 132 and/or the personal computing device 102. For example, in some embodiments, the trusted computing device 132 may determine that provisioning has been requested in response to detecting that a direct wireless connection (e.g., the wireless communication channel 196) has been established with the personal computing device 102. If, at block 502, the trusted computing device 132 determines that provisioning of the personal computing device 102 for enterprise connectivity has not been requested, the method 500 returns to block 502.

In some embodiments, in response to determining that provisioning of the personal computing device 102 for enterprise connectivity has been requested, the method 500 advances to block 504. At block 504, the trusted computing device 132 registers the personal computing device 102 with the domain controller server 172 (e.g., data flow 702 of FIG. 7). As discussed, the certificate server 162 may verify that the personal computing device 102 is registered with the domain controller server 172 before generating an access certificate to provide enterprise connectivity (e.g., permit access to services and/or devices on the network 190) to the personal computing device 102. In embodiments wherein the personal computing device 102 has not yet been registered with the domain controller server 172, the trusted computing device 132 may register the personal computing device 102 with the domain controller server 172 in response to user input received a user interface (UI) displayed on, for example, a display of the trusted computing device 132. In such embodiments, the method 500 advances to block 506 after registration of the personal computing device 102 with the domain controller server 172. However, in embodiments wherein the personal computing device 102 has already been registered with the domain controller server 172, the method 500 advances directly to block 506 in response to determining that provisioning of the personal computing device 102 for enterprise connectivity has been requested.

At block 506, the trusted computing device 132 wirelessly connects directly with the personal computing device 102 that is to be provisioned for enterprise connectivity (e.g., data flow 704 of FIG. 7). For example, a wireless connection such as, for example, the wireless communication channel 196, may be established between the trusted computing device 132 and the personal computing device 102. In some embodiments, the wireless connection (e.g., the wireless communication channel 196) established between the trusted computing device 132 and the personal computing device 102 may be embodied as an NFC communication channel, a Bluetooth® communication channel, and/or a Wi-Fi® communication channel. However, as discussed, the initial communications directly between the trusted computing device 132 and the personal computing device 102 may be established via any suitable type of communication channel (e.g., wired or wireless) in other embodiments. After establishment of a direct connection between the trusted computing device 132 and the personal computing device 102, the method 500 advances to block 508.

At block 508, the trusted computing device 132 generates a public/private key pair on behalf of the personal computing device 102 (e.g., data flow 706 of FIG. 7). In some embodiments, the security engine 140 of the trusted computing device 132 may generate the public/private key pair to facilitate provisioning the personal computing device 102 for enterprise connectivity. The trusted computing device 132, and/or the security engine 140 of the trusted computing device 132, may use any suitable encryption algorithm to generate the public/private key pair. After generation of the public/private key pair on behalf of the personal computing device 102, the method 500 advances to block 510.

At block 510, the trusted computing device 132 may generate a certificate signing request on behalf of the personal computing device 102 (e.g., data flow 708 of FIG. 7). The certificate signing request generated by the trusted computing device 132 may include the public key of the public/private key pair generated on behalf of the personal computing device 102. After generation of the certificate signing request, the method 500 advances to block 512.

At block 512, the trusted computing device 132 sends the certificate signing request to the certificate server 162 (e.g., data flow 710 of FIG. 7). In some embodiments, the certificate signing request may be sent to the certificate server 162 over the network 190. As discussed, the certificate signing request may be embodied as message to the certificate server 162 requesting that one or more certificates be generated to provide the personal computing device 102 with access to the network 190 and/or one or more services provided by the network 190. After sending the certificate signing request to the certificate server 162, the method 500 advances to block 514.

At block 514, the trusted computing device 132 may receive an access certificate generated and sent by the certificate server 162 (e.g., data flow 718 of FIG. 7). As discussed, the access certificate provides the personal computing device 102 with access to the network 190 and/or one or services provided by the network 190. In such embodiments, the trusted computing device 132 receives the access certificate on behalf of the personal computing device 102 since the personal computing device 102 has not yet been provisioned for enterprise connectivity.

In some embodiments, in response to receiving the access certificate from the certificate server 162, the method 500 advances to block 516 in which the trusted computing device 132 protects the information generated and/or received on behalf of the personal computing device. In such embodiments, the trusted computing device 132 may package the access certificate and the private key of the public/private key pair into a secure container. The secure container may be protected by a passphrase or a password in accordance with various public-key cryptography standards such as, for example, those described in "PKCS 12 v1.0: Personal Information Exchange Syntax" by RSA Data Security, Inc., Public-Key Cryptography Standards (PKCS), published Jun. 24, 1999.

Additionally or alternatively, in some embodiments, the trusted computing device 132 may also download, at block 518, other certificates from the certificate server 162 in addition to the access certificate (e.g., data flow 720 of FIG. 7). For example, in some embodiments, the trusted computing device 132 may download or otherwise receive a separate certificate for each service (e.g., virtual private network services, Hypertext Transfer Protocol services, e-mail services, etc.) the personal computing device 102 is permitted to access via the network 190.

At block 520, the trusted computing device 132 may securely export the access certificate received from the certificate server 162 and the private key of the public/private key pair, to the personal computing device 102 over the communication channel 196 (e.g., data flow 722 of FIG. 7). In some embodiments, the trusted computing device 132 may use one or more encryption keys to encrypt the access certificate and the private key prior to export. Once provisioned with the access certificate, the personal computing device 102 may use the certificate to access the network 190 and/or one or more services on the network 190. In embodiments wherein additional certificates are received from the certificate server 162 and/or the access certificate and the private key are packaged into a secure container, the trusted computing device 132 may also securely export the additional certificates and/or the secure container to the personal computing device 102 via the communication channel 196. As discussed, the personal computing device 102 may also access a web server 214 executing on the trusted computing device 132 to download or otherwise retrieve the access certificate, the private key of the public/private key pair, and/or any other type of information from trusted computing device 132.

Figure 6:
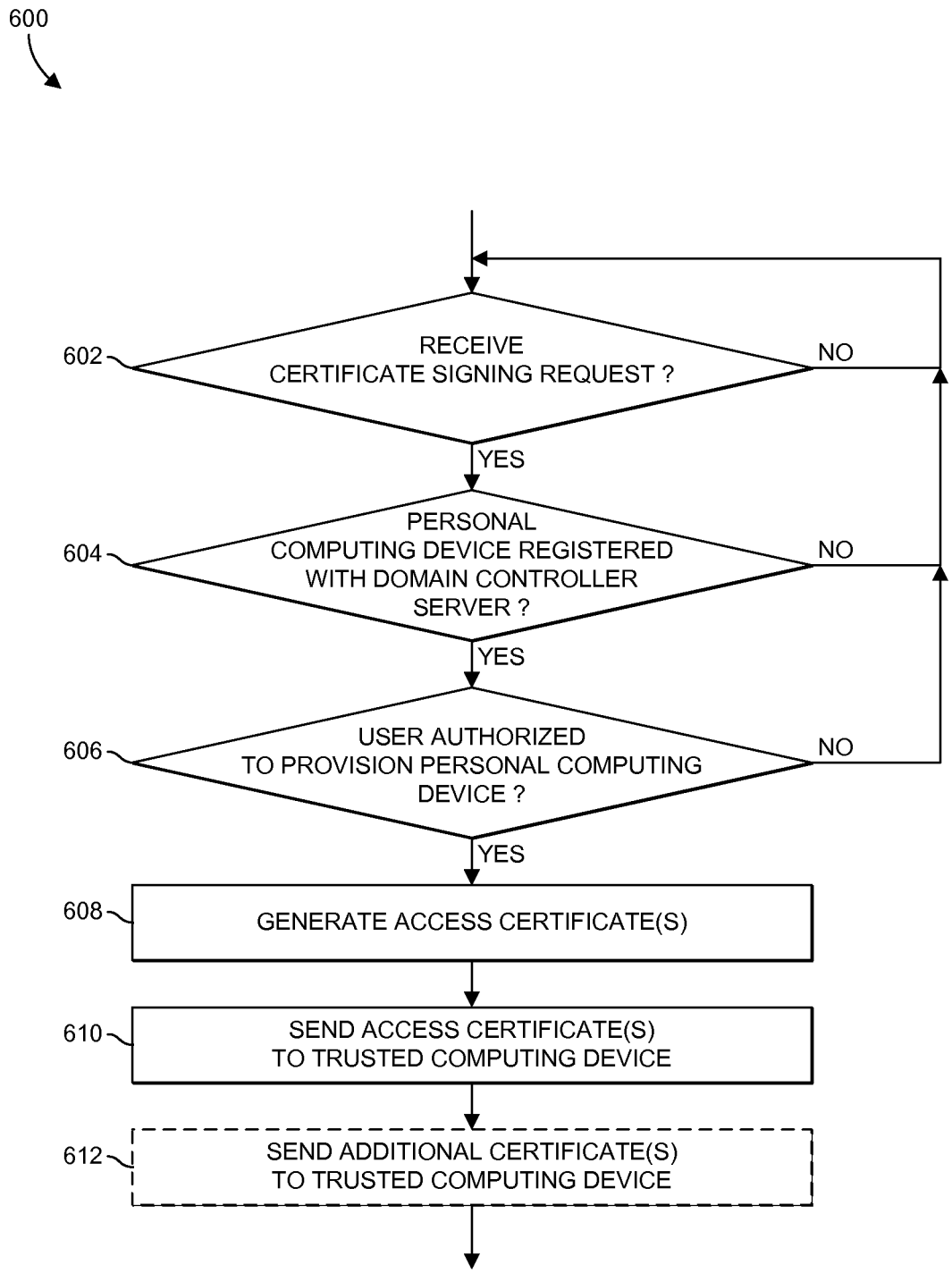
FIG. 6 is a simplified flow diagram of at least one embodiment of a method for securely providing a personal computing device with access certificates for enterprise connectivity that may be executed by the certificate server of FIGS. 1 and 4.

Referring now to FIG. 6, taken with FIG. 7, in use, the certificate server 162 may execute a method 600 for securely providing a personal computing device with one or more access certificates for enterprise connectivity. The method 600 begins with block 602 in which the certificate server 162 determines whether a certificate signing request has been received from the trusted computing device 132 over the network 190 (e.g., data flow 710 of FIG. 7). If, at block 602, the certificate server 162 determines that a certificate signing request has been received from the trusted computing device 132, the method 600 advances to block 604. If, however, the certificate server 162 instead determines at block 602 that a certificate signing request has not been received from the trusted computing device 132, the method 600 returns to block 602.

At block 604, the certificate server 162 verifies that the personal computing device 102 to be provisioned with enterprise connectivity is registered with the domain controller server 172 (e.g., data flow 712 of FIG. 7). To do so, the certificate server 162 may send a message to the domain controller server 172 requesting validation that the personal computing device 102 is registered. The validation request sent by the certificate server 162 may include information that uniquely identifies the personal computing device 102 (e.g., a serial number, a media access control address, a device name, or any other type of unique identifier). In some embodiments, the information that uniquely identifies the personal computing device 102 may be included with the certificate signing request, which was received from the trusted computing device 132. The certificate server 162 may thereafter receive a response from the domain controller server 172 indicative of whether the personal computing device 102 is registered and, in some embodiments, what computing devices and/or services the personal computing device 102 is permitted to access on the network 190. As discussed, the domain controller server 172 may make such determinations based at least in part on, or otherwise as a function of, one or more security policies corresponding to the network 190. If, at block 604, the certificate server 162 determines from the response (e.g., data flow 714 of FIG. 7) that the personal computing device 102 is registered with the domain controller server 172, the method 600 advances to block 606. If, however, the certificate server 162 instead determines from the response that the personal computing device 102 is not yet registered with the domain controller server 172 (or has insufficient permissions), the method 600 returns to block 602.

At block 606, the certificate server 162 verifies that the user of the personal computing device 102 is authorized to provision the device for enterprise connectivity (e.g., data flow 712 of FIG. 7). To do so, the certificate server 162 may send a message to the domain controller server 172 requesting validation that the user of the personal computing device 102 has the requisite permissions to provision the device. The user validation request sent by the certificate server 162 may include information that uniquely identifies the user of the personal computing device (e.g., a user identification number, a username, or any other type of unique identifier). In some embodiments, the information that uniquely identifies the user of the personal computing device 102 may be included with the certificate signing request, which was received from the trusted computing device 132. The certificate server 162 may thereafter receive a response from the domain controller server 172 indicative of whether the user of the personal computing device 102 has the required permissions to provision the device for enterprise connectivity. In some embodiments, the domain controller server 172 may make such determinations based at least in part on, or otherwise as a function of, one or more security policies corresponding to the user and/or the network 190. If, at block 606, the certificate server 162 determines from the response (e.g., data flow 714 of FIG. 7) that the user of the personal computing device 102 is authorized to provision the device for enterprise connectivity, the method 600 advances to block 608. If, however, the certificate server 162 instead determines from the response that user of the personal computing device 102 is not authorized to provision the device for enterprise connectivity, the method 600 returns to block 602.

It should be appreciated that in some embodiments the message sent to the domain controller server 172 (e.g., data flow 712 of FIG. 7) may include both the request to verify that the personal computing device 102 is registered and the request to verify that the user of the personal computing device 102 is authorized to provision the device for enterprise connectivity as a single request message. Additionally or alternatively, the response message received from the domain controller server 172 (e.g., data flow 714 of FIG. 7) may include a single response to one or more verification requests sent by the certificate server 162.

At block 608, the certificate server 162 generates an access certificate for the personal computing device 102 (e.g., data flow 716 of FIG. 7). To generate the access certificate, the certificate server 162 may, in some embodiments, digitally sign the public key that was generated by the trusted computing device 132 on behalf of the personal computing device 102 and was included in the certificate signing request. In such embodiments, a private key associated with the certificate server 162 may be used to digitally sign the public key of the personal computing device 102.

After generation of the access certificate, the method 600 advances to block 610 in which the certificate server 162 sends the access certificate to the trusted computing device 132. In some embodiments, the certificate server 162 sends the access certificate to the trusted computing device 132 over the network 190. As discussed, the trusted computing device 132 may then provide the access certificate to the personal computing device 102. Once provisioned with the access certificate, the personal computing device 102 may use the certificate to access the network 190 and/or one or more services on the network 190.

At block 612, the certificate server 162 may generate and send (e.g. data flow 720 of FIG. 7), in some embodiments, other certificates to the trusted computing device 132 for the personal computing device 102. For example, in some embodiments, the certificate server may generate a separate certificate for each service (e.g., virtual private network services, Hypertext Transfer Protocol services, e-mail services, etc.) the personal computing device 102 is permitted to access via the network 190. In such embodiments, the certificate server 162 may send or otherwise make each of the other certificates available to be retrieved by the trusted computing device 132 over the network 190. The additional certificates obtained by the trusted computing device 132 may then be sent to the personal computing device 102 as discussed above.

EXAMPLES

Illustrative examples of the devices, systems, and methods disclosed herein are provided below. An embodiment of the devices, systems, and methods may include any one or more, and any combination of, the examples described below.

Example 1 includes a trusted computing device for securely provisioning a personal computing device for enterprise connectivity, the trusted computing device having previously been provisioned for enterprise connectivity and including a communication module to establish a communication channel with the personal computing device; and a security module to (i) generate a key pair on behalf of the personal computing device, (ii) generate a certificate signing request on behalf of the personal computing device, (iii) send the certificate signing request on behalf of the personal computing device, (iv) receive an access certificate for accessing enterprise resources on behalf of the personal computing device, and (v) securely export the access certificate to the personal computing device.

Example 2 includes the subject matter of Example 1, and wherein the key pair generated on behalf of the personal computing device includes a public key and a private key generated on behalf of the personal computing device; and wherein the certificate signing request includes the public key generated on behalf of the personal computing device.

Example 3 includes the subject matter of any of Examples 1 and 2, and wherein to establish a communication channel with the personal computing device includes to establish a first communication channel with the personal computing device; and wherein the communication module further to establish a second communication channel with a certificate server, the trusted computing device having previously established a trust with the certificate server.

Example 4 includes the subject matter of any of Examples 1-3, and wherein the first communication channel includes direct wireless communications between the communication module and the personal computing device; and wherein the second communication channel includes communications between the communication module and the certificate server over a network.

Example 5 includes the subject matter of any of Examples 1-4, and wherein to send the certificate signing request on behalf of the personal computing device includes to send the certificate signing request on behalf of the personal computing device to the certificate server over the second communication channel; wherein to receive an access certificate for accessing enterprise resources on behalf of the personal computing device includes to receive an access certificate from the certificate server over the second communication channel; and wherein to securely export the access certificate to the personal computing device includes to securely export the access certificate to the personal computing device over the first communication channel.

Example 6 includes the subject matter of any of Examples 1-5, and wherein the access certificate received from the certificate server includes the public key generated on behalf of the personal computing device digitally signed with a private key of the certificate server; and wherein to securely export the access certificate to the personal computing device over the first communication channel includes to securely export the received access certificate and the private key generated on behalf of the personal computing device to the personal computing device over the first communication channel.

Example 7 includes the subject matter of any of Examples 1-6, and wherein the security module further to receive one or more additional access certificates for accessing enterprise resources on behalf of the personal computing device, each of the one or more additional access certificates for accessing a different enterprise resource.

Example 8 includes the subject matter of any of Examples 1-7, and wherein the security module further to package the received access certificate and a private key of the key pair generated on behalf of the personal computing device into a secure container, the secure container being protected with a passphrase.

Example 9 includes the subject matter of any of Examples 1-8, and wherein to generate a key pair on behalf of the personal computing device includes to generate a key pair in a security engine of the trusted computing device.

Example 10 includes the subject matter of any of Examples 1-9, and wherein the security module further to establish a web server; and wherein to securely export the access certificate to the personal computing device includes to provide the access certificate to the personal computing device via the web server.

Example 11 includes a method for securely provisioning a personal computing device for enterprise connectivity. The method includes establishing, on a trusted computing device, a communication channel with the personal computing device, the trusted computing device having previously been provisioned for enterprise connectivity; generating, on the trusted computing device, a key pair on behalf of the personal computing device; generating, on the trusted computing device, a certificate signing request on behalf of the personal computing device; sending, on the trusted computing device, the certificate signing request on behalf of the personal computing device; receiving, on the trusted computing device, an access certificate for accessing enterprise resources on behalf of the personal computing device; and securely exporting, on the trusted computing device, the access certificate to the personal computing device.

Example 12 includes the subject matter of Example 11, and wherein generating a key pair on behalf of the personal computing device includes generating a public key and a private key on behalf of the personal computing device; and wherein the certificate signing request includes the public key generated on behalf of the personal computing device.

Example 13 includes the subject matter of any of Examples 11 and 12, and wherein establishing a communication channel with the personal computing device includes establishing a first communication channel with the personal computing device; and wherein the method further includes establishing, on the trusted computing device, a second communication channel with a certificate server, the trusted computing device having previously established a trust with the certificate server.

Example 14 includes the subject matter of any of Examples 11-13, and wherein the first communication channel includes direct wireless communications between the trusted computing device and the personal computing device; and wherein the second communication channel includes communications between the trusted computing device and the certificate server over a network.

Example 15 includes the subject matter of any of Examples 11-14, and wherein sending the certificate signing request on behalf of the personal computing device includes sending the certificate signing request on behalf of the personal computing device to the certificate server over the second communication channel; wherein receiving an access certificate for accessing enterprise resources on behalf of the personal computing device includes receiving an access certificate from the certificate server over the second communication channel; and wherein securely exporting the access certificate to the personal computing device includes securely exporting the access certificate to the personal computing device over the first communication channel.

Example 16 includes the subject matter of any of Examples 11-15, and wherein the access certificate received from the certificate server includes the public key generated on behalf of the personal computing device digitally signed with a private key of the certificate server; and wherein securely exporting the access certificate to the personal computing device over the first communication channel includes securely exporting the received access certificate and the private key generated on behalf of the personal computing device to the personal computing device over the first communication channel.

Example 17 includes the subject matter of any of Examples 11-16, and further including receiving, on the trusted computing device, one or more additional access certificates for accessing enterprise resources on behalf of the personal computing device, each of the one or more additional access certificates for accessing a different enterprise resource.

Example 18 includes the subject matter of any of Examples 11-17, and further including packaging, on the trusted computing device, the received access certificate and a private key of the key pair generated on behalf of the personal computing device into a secure container, the secure container being protected with a passphrase.

Example 19 includes the subject matter of any of Examples 11-18, and wherein generating a key pair on behalf of the personal computing device includes generating a key pair in a security engine of the trusted computing device.

Example 20 includes the subject matter of any of Examples 11-19, and further including establishing, on the trusted computing device, a web server; and wherein securely exporting the access certificate to the personal computing device includes providing the access certificate to the personal computing device via the web server.

Example 21 includes a trusted computing device for securely provisioning a personal computing device for enterprise connectivity, the trusted computing device having previously been provisioned for enterprise connectivity and including a processor; and a memory having stored therein a plurality of instructions that when executed by the processor cause the trusted computing device to perform the method of any of Examples 11-20.

Example 22 includes one or more machine readable media including a plurality of instructions stored thereon that in response to being executed result in a trusted computing device performing the method of any of Examples 11-20.

Example 23 includes a certificate server for securely provisioning a personal computing device for enterprise connectivity. The certificate server includes a communication module to (i) receive a certificate signing request sent over a network on behalf of the personal computing device, and (ii) send an access certificate for accessing enterprise resources by the personal computing device; and a certificate provisioning module to (i) verify that the personal computing device is registered, (ii) verify that a user of the personal computing device is authorized to provision the personal computing device for enterprise connectivity, and (iii) generate the access certificate for accessing enterprise resources by the personal computing device.

Example 24 includes the subject matter of Example 23, and wherein the certificate provisioning module further to generate one or more additional access certificates for accessing enterprise resources by the personal computing device, each of the one or more additional access certificates for accessing a different enterprise resource by the personal computing device.

Example 25 includes the subject matter of any of Examples 23 and 24, and wherein to receive a certificate signing request sent over a network on behalf of the personal computing device includes to receive a certificate signing request generated by a trusted computing device on behalf of the personal computing device and sent over the network, the trusted computing device having previously been provisioned for enterprise connectivity; and wherein to send an access certificate for accessing enterprise resources by the personal computing device includes to send an access certificate for accessing enterprise resources by the personal computing device to the trusted computing device over the network for subsequent secure export to the personal computing device.

Example 26 includes the subject matter of any of Examples 23-25, and wherein the received certificate signing request includes a public key of a public/private key pair generated on behalf of the personal computing device; and wherein to generate the access certificate for accessing enterprise resources by the personal computing device includes to digitally sign the public key of the public/private key pair generated on behalf of the personal computing device with a private key of the certificate server.

Example 27 includes the subject matter of any of Examples 23-26, and wherein to verify that the personal computing device is registered includes to send a verification request over the network to a domain controller server requesting verification that the personal computing device is registered; and wherein to verify that a user of the personal computing device is authorized to provision the personal computing device for enterprise connectivity includes to send a verification request over the network to the domain controller server requesting verification that the user of the personal computing device is authorized to provision the personal computing device for enterprise connectivity.

Example 28 includes a method for securely provisioning a personal computing device for enterprise connectivity. The method includes receiving, on a certificate server, a certificate signing request sent over a network on behalf of the personal computing device; verifying, on the certificate server, that the personal computing device is registered; verifying, on the certificate server, that a user of the personal computing device is authorized to provision the personal computing device for enterprise connectivity; generating, on the certificate server, an access certificate for accessing enterprise resources by the personal computing device; and sending, on the certificate server, the access certificate for accessing enterprise resources by the personal computing device over the network.

Example 29 includes the subject matter of Example 28, and further including generating, on the certificate server, one or more additional access certificates for accessing enterprise resources by the personal computing device, each of the one or more additional access certificates for accessing a different enterprise resource by the personal computing device.

Example 30 includes the subject matter of any of Examples 28 and 29, and wherein receiving a certificate signing request sent over a network on behalf of the personal computing device includes receiving a certificate signing request generated by a trusted computing device on behalf of the personal computing device and sent over the network, the trusted computing device having previously been provisioned for enterprise connectivity, and wherein sending an access certificate for accessing enterprise resources by the personal computing device includes sending an access certificate for accessing enterprise resources by the personal computing device to the trusted computing device over the network for subsequent secure export to the personal computing device.

Example 31 includes the subject matter of any of Examples 28-30, and wherein the received certificate signing request includes a public key of a public/private key pair generated on behalf of the personal computing device; and wherein generating the access certificate for accessing enterprise resources by the personal computing device includes digitally signing the public key of the public/private key pair generated on behalf of the personal computing device with a private key of the certificate server.

Example 32 includes the subject matter of any of Examples 28-31, and wherein verifying that the personal computing device is registered includes sending a verification request over the network to a domain controller server requesting verification that the personal computing device is registered; and wherein verifying that a user of the personal computing device is authorized to provision the personal computing device for enterprise connectivity includes sending a verification request over the network to the domain controller server requesting verification that the user of the personal computing device is authorized to provision the personal computing device for enterprise connectivity.

Example 33 includes a certificate server for securely provisioning a personal computing device for enterprise connectivity, the certificate server including a processor; and a memory having stored therein a plurality of instructions that when executed by the processor cause the certificate server to perform the method of any of Examples 28-32.

Example 34 includes one or more machine readable media including a plurality of instructions stored thereon that in response to being executed result in a certificate server performing the method of any of Examples 28-32.

The invention claimed is:

1. One or more non-transitory, machine readable media comprising a plurality of instructions stored thereon that in response to being executed result in a trusted computing device:

establishing a first communication channel with a personal computing device, the trusted computing device having previously been provisioned for enterprise connectivity by receiving a first access certificate from a certificate server, wherein the first communication channel comprises direct wireless communications between the trusted computing device and the personal computing device;

establishing a second communication channel with the certificate server, the trusted computing device having previously established a trust with the certificate server, wherein the second communication channel comprises communications between the trusted computing device and the certificate server over a network;

generating a key pair on behalf of the personal computing device, the key pair comprising a public key and a private key;

generating a certificate signing request on behalf of the personal computing device, the certificate signing request comprising the public key of the key pair generated on behalf of the personal computing device, wherein the certificate signing request is indicative of a request to provide the personal computing device with access to enterprise resources;

sending the certificate signing request on behalf of the personal computing device;

receiving a second access certificate for accessing enterprise resources on behalf of the personal computing device in response to sending the certificate signing request; and securely exporting the second access certificate and the private key of the key pair generated on behalf of the personal computing device to the personal computing device.

2. The one or more non-transitory, machine readable media of claim 1, wherein sending the certificate signing request on behalf of the personal computing device comprises sending the certificate signing request on behalf of the personal computing device to the certificate server over the second communication channel;

wherein receiving the second access certificate for accessing enterprise resources on behalf of the personal computing device comprises receiving the second access certificate from the certificate server over the second communication channel, the second access certificate received from the certificate server comprises the public key of the key pair generated on behalf of the personal computing device digitally signed with a private key of the certificate server; and wherein securely exporting the second access certificate and the private key to the personal computing device comprises securely exporting the second access certificate received from the certificate server and the private key to the personal computing device over the first communication channel.

3. A trusted computing device for securely provisioning a personal computing device for enterprise connectivity, the trusted computing device having previously been provisioned for enterprise connectivity by receipt of a first access certificate from a certificate server, the trusted computing device comprising:

a communication hardware module to (i) establish a first communication channel with the personal computing device, wherein the first communication channel comprises direct wireless communications between the communication hardware module and the personal computing device, and (ii) establish a second communication channel with the certificate server, the trusted computing device having previously established a trust with the certificate server, wherein the second communication channel comprises communications between the communication hardware module and the certificate server over a network; and a security hardware module to (i) generate a key pair on behalf of the personal computing device, wherein the key pair comprises a public key and a private key generated on behalf of the personal computing device, (ii) generate a certificate signing request on behalf of the personal computing device, wherein the certificate signing request is indicative of a request to provide the personal computing device with access to enterprise resources, (iii) send the certificate signing request on behalf of the personal computing device, (iv) receive a second access certificate for accessing enterprise resources on behalf of the personal computing device in response to a sending of the certificate signing request, and (v) securely export the second access certificate and the private key of the key pair generated on behalf of the personal computing device to the personal computing device.

4. The trusted computing device of claim 3, wherein the certificate signing request comprises the public key generated on behalf of the personal computing device.

5. The trusted computing device of claim 3, wherein to send the certificate signing request on behalf of the personal computing device comprises to send the certificate signing request on behalf of the personal computing device to the certificate server over the second communication channel;

wherein to receive the second access certificate for accessing enterprise resources on behalf of the personal computing device comprises to receive the second access certificate from the certificate server over the second communication channel; and wherein to securely export the second access certificate to the personal computing device comprises to securely export the second access certificate to the personal computing device over the first communication channel.

6. The trusted computing device of claim 5, wherein the second access certificate received from the certificate server comprises the public key generated on behalf of the personal computing device digitally signed with a private key of the certificate server; and wherein to securely export the second access certificate to the personal computing device over the first communication channel comprises to securely export the received second access certificate and the private key generated on behalf of the personal computing device to the personal computing device over the first communication channel.

7. The trusted computing device of claim 3, wherein the security hardware module is further to receive one or more additional access certificates for accessing enterprise resources on behalf of the personal computing device, each of the one or more additional access certificates for accessing a different enterprise resource.

8. The trusted computing device of claim 3, wherein the security hardware module is further to package the received second access certificate and the private key of the key pair generated on behalf of the personal computing device into a secure container, the secure container being protected with a passphrase.

9. The trusted computing device of claim 3, wherein to generate a key pair on behalf of the personal computing device comprises to generate a key pair in a security engine of the trusted computing device, wherein the security engine comprises a security co-processor that is independent of a main processor of the trusted computing device.

10. The trusted computing device of claim 3, wherein the security hardware module is further to establish a web server; and
   wherein to securely export the second access certificate to the personal computing device comprises to provide the second access certificate to the personal computing device via the web server.

11. A method for securely provisioning a personal computing device for enterprise connectivity, the method comprising:
   establishing, on a trusted computing device, a first communication channel with the personal computing device, the trusted computing device having previously been provisioned for enterprise connectivity by receiving a first access certificate from a certificate server, wherein the first communication channel comprises direct wireless communications between the trusted computing device and the personal computing device;
   establishing, on the trusted computing device, a second communication channel with the certificate server, the trusted computing device having previously established a trust with the certificate server, wherein the second communication channel comprises communications between the trusted computing device and the certificate server over a network;
   generating, on the trusted computing device, a key pair on behalf of the personal computing device, the key pair comprising a public key and a private key;
   generating, on the trusted computing device, a certificate signing request on behalf of the personal computing device, wherein the certificate signing request is indicative of a request to provide the personal computing device with access to enterprise resources;
   sending, on the trusted computing device, the certificate signing request on behalf of the personal computing device;
   receiving, on the trusted computing device, a second access certificate for accessing enterprise resources on behalf of the personal computing device in response to sending the certificate signing request; and
   securely exporting, on the trusted computing device, the second access certificate and the private key of the key pair generated on behalf of the personal computing device to the personal computing device.

12. The method of claim 11,
   wherein the certificate signing request comprises the public key generated on behalf of the personal computing device.

13. The method of claim 11, wherein sending the certificate signing request on behalf of the personal computing device comprises sending the certificate signing request on behalf of the personal computing device to the certificate server over the second communication channel;
   wherein receiving the second access certificate for accessing enterprise resources on behalf of the personal computing device comprises receiving the second access certificate from the certificate server over the second communication channel; and
   wherein securely exporting the second access certificate to the personal computing device comprises securely exporting the second access certificate to the personal computing device over the first communication channel.

14. The method of claim 13, wherein the second access certificate received from the certificate server comprises the public key generated on behalf of the personal computing device digitally signed with a private key of the certificate server; and
   wherein securely exporting the second access certificate to the personal computing device over the first communication channel comprises securely exporting the received second access certificate and the private key generated on behalf of the personal computing device to the personal computing device over the first communication channel.

15. A certificate server for securely provisioning a personal computing device for enterprise connectivity, the certificate server comprising:
   a communication hardware module to (i) establish a communication channel with a trusted computing device, the trusted computing device having previously established a trust with the certificate server, wherein the communication channel comprises communications between the trusted computing device and the certificate server over a network, (ii) receive a certificate signing request sent over the communication channel on behalf of the personal computing device, wherein the certificate signing request is generated by the trusted computing device on behalf of the personal computing device, the trusted computing device having previously been provisioned for enterprise connectivity by receipt of a first access certificate from the certificate server, wherein the received certificate signing request comprises a public key of a public/private key pair generated by the trusted computing device on behalf of the personal computing device, and wherein the private key of the public/private key pair has been securely exported from the trusted computing device to the personal computing device, and (iii) send a second access certificate for accessing enterprise resources by the personal computing device to the trusted computing device over the communication channel in response to receipt of the certificate signing request, wherein to send the second access certificate for accessing enterprise resources by the personal computing device comprises to send the second access certificate for accessing enterprise resources by the personal computing device to the trusted computing device over the network for subsequent secure export to the personal computing device via a direct wireless communications between the trusted computing device and the personal computing device;
   a certificate provisioning hardware module to (i) verify that the personal computing device is registered, (ii) verify that a user of the personal computing device is authorized to provision the personal computing device for enterprise connectivity, and (iii) generate the second access certificate for accessing enterprise resources by the personal computing device in response to verification that the personal computing device is registered and that the user of the personal computing device is authorized, and wherein to generate the second access certificate for accessing enterprise resources by the personal computing device comprises to digitally sign the public key of the public/private key pair generated on behalf of the personal computing device with a private key of the certificate server.

16. The certificate server of claim 15, wherein the certificate provisioning hardware module is further to generate one or more additional access certificates for accessing enterprise resources by the personal computing device, each of the one or more additional access certificates for accessing a different enterprise resource by the personal computing device.

17. The certificate server of claim 15, wherein to verify that the personal computing device is registered comprises to send a verification request over the network to a domain controller server requesting verification that the personal computing device is registered; and
    wherein to verify that a user of the personal computing device is authorized to provision the personal computing device for enterprise connectivity comprises to send a verification request over the network to the domain controller server requesting verification that the user of the personal computing device is authorized to provision the personal computing device for enterprise connectivity.

\* \* \* \* \*